United States Patent Office 3,255,103
Patented June 7, 1966

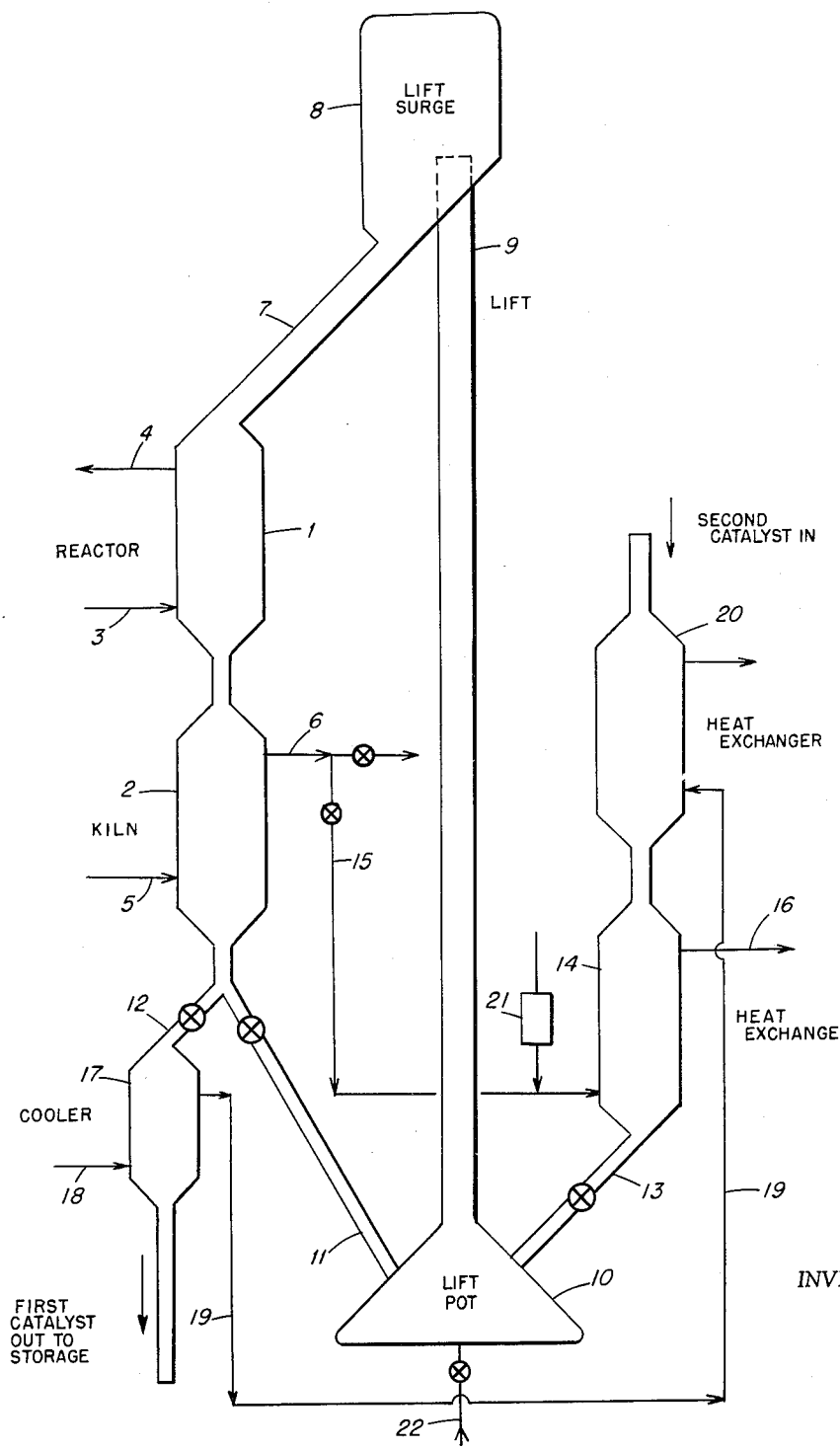

3,255,103
CATALYTIC CONVERSION OF HYDROCARBONS WITH CATALYST ACTIVITY ADJUSTMENT
Frank C. Fahnestock, Roslyn Harbor, N.Y., assignor to Socony Mobil Oil Company, Inc., a corporation of New York
Filed Mar. 20, 1962, Ser. No. 181,033
3 Claims. (Cl. 208—120)

This invention has to do with effecting major alterations in the product distribution in the products of a continuously operating catalytic hydrocarbon conversion system without interruption of the operation of that system.

By product distribution is meant the relative amounts of the various products of conversion at a given conversion level. For example, and of particular commercial importance, it is the ratio of gasoline to distillate fuel oil in a process for the catalytic cracking of gas oil. It is imperative to maintain the quality of the gasoline stream, and this dictates, to a great extent, the overall conditions of cracking, such as temperature, pressure, liquid hourly space velocity, catalyst/oil ratio, and general nature of catalyst. Usually no one can be changed to a great extent without possibility of change in the nature of the gasoline product. However, distillate fuel oil (the current #2 fuel oil, or diesel fuel, or domestic heating oil), a product of boiling range generally lower than the gas oil charge stock, is also produced by the conversion reaction and at rates generally quite parallel to the rate of production of gasoline. For the purposes of explaining this invention, discussion of product distribution will be restricted to this ratio of gasoline to distillate fuel.

Adherence to the fairly fixed product distribution brought about by maintaining unchanged the variables above-noted brings about an economic imbalance arising from producing gasoline at high rate during periods of high distillate fuel requirements and lower gasoline demand (and the reverse), due to seasonal variations in demands of the two products.

This invention has for its object the provision of a method whereby the product distribution of a catalytic cracking process may be altered seasonably, or at will, without major readjustment of the general operating variables of the process. It is based upon the fact that newly developed catalytic materials, and modifications thereof, are peculiarly adaptable to changing the product distribution of a continuously operated catalytic cracking system, through which catalyst flows continuously, without otherwise altering the operating characteristics of the system.

To further explain this concept, there is made use of a moving bed catalytic cracking operation and two exemplary catalyst preparations.

The single figure of the drawing attached hereto shows, in diagram form, features of this operation.

The first exemplary catalyst is a conventional presently used catalyst, an amorphous microporous silica-alumina complex in the form of small hard beads, in which a small amount of fines of specified small size, and of the same composition as the beads has been incorporated, designated Catalyst "A." This catalyst frequently contains a small proportion of chromia.

The second exemplary catalyst is an amorphous microporous silica-alumina bead in which there has been incorporated a small amount of a crystalline aluminosilicate material of zeolitic nature, which bead has similarly had incorporated in its formation a small portion of fines of the same composition as itself. This is designated as Catalyst "B."

To illustrate the difference in product distribution which can be achieved with the two catalysts above-noted, the following data arise from a single-pass operation at the conditions noted, charging a gas-oil derived from a "Mid-Continent" type of crude, i.e., a mixed base crude, largely paraffinic in nature.

TABLE I

|  | Catalyst A | Catalyst B |
|---|---|---|
| Avg. Reactor Temp., °F | 875 | 875 |
| Liquid Hourly Space Velocity | 2 | 2 |
| Pressure, p.s.i.g | 15 | 15 |
| Catalyst/oil wt./wt | 4.5/1 | 4.5/1 |
| Yields: | | |
|   Gasoline (percent vol.) | 38 | 55 |
|   Dist. Fuel Oil (percent vol.) (D.F.O.) | 45 | 31 |
|   "Recycle" Stock (percent vol.) | 7 | 6 |
|   LPG [1] (percent vol.) | 4 | 4 |
|   Gas (percent wt.) | 7 | 5 |
|   Coke (percent wt.) | 2½ | 2 |

[1] Liquefiable petroleum gases.

From the above, it will be noted that, while operated to produce a gasoline of the same quality, for one barrel of gasoline produced the following ratios exist:

TABLE II

|  | Catalyst A | Catalyst B |
|---|---|---|
| Bbl. D.F.O./Bbl. gasoline | 1.18 | .56 |
| Bbl. charge/Bbl. gasoline | 2.62 | 1.82 |
| Bbl. gasoline/Bbl. D.F.O | .85 | 1.77 |
| Bbl. charge/Bbl. D.F.O | 2.22 | 3.22 |

From the above, it may be noted that relatively large swings may be made in proportion of gasoline to distillate fuel oil, while maintaining the same quality level of gasoline, by appropriate selection of catalyst.

While the above tabulations are based upon a specific "B" Catalyst, larger or lesser variations in the nature of the product distribution may be made by altering the nature and amount of the crystalline aluminosilicate ingredient of the catalyst. This invention, therefore, is not concerned with the nature of such catalyst itself, but with the novel manner of utilizing its capabilities.

The specific improved catalyst designated as "B" herein is prepared by conventional bead manufacturing techniques, with the exception of steps connected with the rare-earth exchanged aluminosilicate component.

Linde 13× molecular sieve, which is a crystalline alumino-silicate described in U.S. Patent 2,882,244, was exchanged with rare-earth chloride solution (containing 4% of $RECl_3 \cdot 6H_2O$) at 180–200° F. to remove sodium ions from the sieve and replace them with the chemical equivalent of rare-earth ions. The sieve was then washed free of soluble salts. The RE–X aluminosilicate thus produced contained 1.0–1.5% weight sodium and about 25% weight rare-earth compounds calculated as $RE_2O_3$.

The RE–X aluminosilicate was dispersed with fines into a silica-alumina hydrogel to form a catalyst of conventional bead type.

The resultant gel beads were base-exchanged with an $(NH_4)_2SO_4$ solution to remove sodium from the silica-alumina matrix and then washed free of soluble salts.

The catalyst was next dried at 250–300° F. and then calcined for 4.4 hours at 1250° F. and 15 p.s.i.g. pressure in 100% steam. The finished catalyst contained 5% wt. of rare-earth exchanged 13× aluminosilicate, 34% of A-2 alumina fines and the remainder was co-gelled silica and alumina.

While the above data were developed in a moving bed operation, and with the bead-form catalyst customarily used in such operations, the invention is not limited thereto. The catalyst material, a complex or composite of rare-earth exchanged crystalline aluminosilicate in an amorphous silica-alumina matrix with added fines of a size and amount to control the physical nature of the matrix in known manner may be provided in various form as adapted to various processes. The composite catalyst may be in the form of microspheres, for example, useful in fluidized bed catalytic cracking operations. It may be in the form of a pelleted material or granules, or powder, of the usual sizes and configurations, and produced by the customary methods.

The exemplary catalytic composite is composed of three ingredients. The "matrix" material is an active "acid" cracking catalyst, a siliceous material which may originate by any of the usual processes of co-gelation or co-precipitation, or may be of clay origin. A second ingredient is the material incorporated as fines of controlled size and amount, added for control of the physical properties of the matrix. The third, and characterizing ingredient, is a rare-earth exchanged aluminosilicate of ordered crystalline structure and of a kind capable of cation exchange with a medium containing rare-earth cations.

The amount of the rare-earth exchanged crystalline aluminosilicate may vary from a rather small, but significant amount of about 1 or 2 weight percent of the composite up to one having a preponderance of this characterizing ingredient. For operations conducted at or near the usual conditions of catalytic cracking, i.e., with the variables of liquid hourly space velocity, catalyst/oil ratio, temperature and pressure at about the usual levels to permit conducting the operation in presently existing equipment, the preferred level of characterizing component is about 5 to 15 weight percent.

In the claims, where the term "catalytic composite of a siliceous acidic cracking component and a rare-earth exchanged crystalline aluminosilicate" is used, reference is made to the above described composite catalysts.

In describing the catalytic composite, the term "siliceous acidic cracking component" is understood to refer to an amorphous, i.e., noncrystalline material, whether prepared by co-gelation, gelation, co-precipitation, and the like, or from clays, which materials are substantially free from added crystalline aluminosilicate materials.

The way in which transition from one catalyst to a second catalyst may be made in an operating system without shutdown is more or less dependent upon certain characteristics of the system.

For example, in a moving bed process handling about 20,000 bbls. per day of charging stock, the catalyst inventory within the operating portions of the system is about 600 tons, and its rate of circulation is about 400 tons or more per hour, such a system, well designed and well operated, with a competent catalyst, will experience a degradation of catalyst to fines at a rate of about 2 tons or less per day. This is removed through an "elutriator" and make up catalyst is added at a balancing rate. Obviously, change of catalyst type by this means is not only far too slow, but would result only in admixture of catalyst.

Examination of various rates of addition of a second catalyst and withdrawal of a first catalyst will show that with any rate of change less than the circulation rate, a clean partition between the first and second catalyst cannot be obtained. For example, in the above-described operation with an inventory of 600 tons of the first catalyst, and a circulation rate of 400 tons per hour, addition of a second catalyst at a rate of 200 tons per hour, with concurrent withdrawal at the same rate to keep inventory constant, will at the end of three hours, have added 600 tons of second catalyst, will have withdrawn 600 tons of catalyst, about three quarters of which is first catalyst and one quarter of which is second catalyst, and will leave in operating inventory 600 tons of catalyst, about three-quarters of which is second catalyst, the remainder being first catalyst. Lesser rates of addition will give more serious admixture.

Necessary precautions must be taken when adding catalyst to a circulating catalyst system at such high rates. The most important one is maintenance of the temperature of the reaction zone. It must not be seriously quenched by the addition of catalyst substantially colder than that normally added, although some drop in catalyst temperature can be corrected by raising the temperature of the reactant charge.

To this end, the arrangement shown in the single figure of drawing attached hereto, which is highly diagrammatic, may be used.

In the drawing, 1 is a reactor and 2 is a kiln for catalyst regeneration. Reactants are fed at 3 and reaction products removed at 4. Kiln air is supplied at 5 and flue gas removed at 6. In normal operation, catalyst enters the reactor at 7 from catalyst surge 8 to which it is supplied by lift 9 from lift pot 10, and passes from kiln 2 to lift pot 10 by pipe 11.

When changing from a first catalyst in the system to a second catalyst, first catalyst will be diverted from the system through pipe 12 and a corresponding amount of second catalyst supplied to the lift pot 10 through pipe 13. As pointed out above, the most desirable rate of change is one where the second catalyst is supplied at the full circulation rate of the system, so, when so doing, pipe 11 will be closed and all catalyst from the kiln 2 will flow through pipe 12.

When adding second catalyst at high rates, its temperature must be raised to approximately the temperature ordinarily held by circulating catalyst from regeneration. To this end, a heat exchanger 14 is provided, through which kiln flue gases are introduced by pipe 15. This heat exchanger need be only a vessel in which a moving bed of catalyst is contacted with the flue gas, which will leave through pipe 16.

In some cases, the first catalyst may be sent to a hot storage bin. In many, it will not be stored hot, and to cool it, a similar heat exchanger 17 may be used, fed with ambient temperature air at 18, and the air, so heated, may be used for second catalyst preheating by passing it through pipe 19 to heat exchanger 20. If sufficient heat is not available in flue gas from the kiln, an "air line heater" in which air is heated by combustion of fuel therein may be inserted at 21, or in other convenient locations which suggest themselves to those skilled in the art. Lift fluid—usually air—is supplied to the lift pot 10 at 22.

By means of the above system, a catalytic cracking operation may be converted from one type of product distribution to another in a matter of a few hours, without shutdown.

I claim:

1. In a cyclically operating catalytic cracking system, in which a catalyst cycles through reaction and regeneration,
   that method of changing the product distribution of the reaction which comprises
   withdrawing a first catalyst from the system after its regeneration,
   at a high rate, of the order of about half the rate at which catalyst is circulated within the system
   and adding to the system an amount, equal to that withdrawn, of a second catalyst,
   the second catalyst being heated to a temperature substantially the same as that of the circulating catalyst at the point of introduction of the second catalyst
   to maintain without substantial change the operating variables of the system
   in which one catalyst is an amorphous siliceous acidic cracking catalyst
   and the other catalyst is a composite of a siliceous acidic cracking component and a rare-earth exchanged crystalline aluminosilicate.

2. The method of claim 1, in which the rare-earth exchanged crystalline aluminosilicate component of the composite catalyst is present in such composite to the extent of at least 5 percent by weight.

3. The method of claim 1, in which the rare-earth exchanged crystalline aluminosilicate component of the composite catalyst is present to the extent of at least about 5 percent by weight, said crystalline aluminosilicate component containing about 25 weight percent of rare-earth compounds calculated as $RE_2O_3$.

References Cited by the Examiner

UNITED STATES PATENTS

| | | | |
|---|---|---|---|
| 2,361,978 | 11/1944 | Swearingen | 208—120 |
| 2,786,800 | 3/1957 | Myers | 208—173 |
| 2,962,435 | 11/1960 | Fleck et al. | 208—120 |
| 2,971,903 | 2/1961 | Kimberlin et al. | 208—119 |

OTHER REFERENCES

"Catalysts for Petroleum Refining," by Riesz et al., pages 292 and 293, vol. 4, Advances in Petroleum Chem. and Refining, 1961, Interscience Publishers Inc., New York.

DELBERT E. GANTZ, *Primary Examiner.*

MILTON STERMAN, ABRAHAM RIMENS, ALPHONSO D. SULLIVAN, *Assistant Examiners.*